(12) United States Patent
Yin et al.

(10) Patent No.: US 9,521,429 B2
(45) Date of Patent: Dec. 13, 2016

(54) METHODS AND APPARATUS FOR MULTI-VIEW VIDEO CODING

(71) Applicant: THOMSON LICENSING, Issy de Moulineaux (FR)

(72) Inventors: Peng Yin, Ithaca, NY (US); Yeping Su, Cupertino, CA (US); Cristina Gomila, Cesson-Sevigne (FR)

(73) Assignee: Thomson Licensing, Issy les-Moulineaux (FR)

( * ) Notice: Subject to any disclaimer, the term of this patent is extended or adjusted under 35 U.S.C. 154(b) by 0 days.

(21) Appl. No.: 14/824,879

(22) Filed: Aug. 12, 2015

(65) Prior Publication Data

US 2015/0350668 A1  Dec. 3, 2015

Related U.S. Application Data (63) Continuation of application No. 13/872,502, filed on Apr. 29, 2013, now Pat. No. 9,143,782, which is a
(Continued)

(51) Int. Cl.
*H04N 7/12* (2006.01)
*H04N 19/597* (2014.01)
(Continued)

(52) U.S. Cl.
CPC .......... *H04N 19/597* (2014.11); *H04N 19/109* (2014.11); *H04N 19/137* (2014.11);
(Continued)

(58) Field of Classification Search
CPC ...... H04N 19/597; H04N 19/46; H04N 19/61; H04N 19/70; H04N 19/176; H04N 19/82; H04N 19/573; H04N 19/137; H04N 19/10; H04N 19/109; H04N 19/174
(Continued)

(56) References Cited

U.S. PATENT DOCUMENTS

| 5,202,760 A | 4/1993 | Tourtier et al. |
| 5,617,334 A | 4/1997 | Tseng et al. |

(Continued)

FOREIGN PATENT DOCUMENTS

| CN | 1197571 | 10/1998 |
| CN | 1239566 | 12/1999 |

(Continued)

OTHER PUBLICATIONS

Sullivan et al.: "Draft of Version 4 of H.264/AVC," (ITU-T Recommendation H.264 and ISO/IEC 14496-10 (MPEG-4 part 10) Advanced Video Coding), Doc: JVT-M050d4, Palma de Mallorca, ES, Oct. 18-22, 2004, 331 pages.

(Continued)

*Primary Examiner* — Gims Philippe
(74) *Attorney, Agent, or Firm* — Brian J. Dorini; Xiaoan Lu (57) ABSTRACT

There are provided methods and apparatus for multi-view video coding. A video encoder includes an encoder for encoding a block in a picture by choosing between temporal prediction and cross-view prediction to enable a prediction for the block. The picture is one of a set of pictures corresponding to multi-view video content and having different view points with respect to a same or similar scene. The picture represents one of the different view points. A high-level syntax is used to indicate the use of cross-view prediction for the block.

13 Claims, 6 Drawing Sheets

Related U.S. Application Data continuation of application No. 12/087,357, filed as application No. PCT/US2007/000199 on Jan. 8, 2007, now Pat. No. 8,842,729.

(60) Provisional application No. 60/757,289, filed on Jan. 9, 2006.

(51) Int. Cl.
| | |
|---|---|
| *H04N 19/52* | (2014.01) |
| *H04N 19/176* | (2014.01) |
| *H04N 19/70* | (2014.01) |
| *H04N 19/46* | (2014.01) |
| *H04N 19/109* | (2014.01) |
| *H04N 19/137* | (2014.01) |
| *H04N 19/174* | (2014.01) |
| *H04N 19/573* | (2014.01) |
| *H04N 19/58* | (2014.01) |
| *H04N 19/82* | (2014.01) |
| *H04N 19/10* | (2014.01) |

(52) U.S. Cl.
CPC ......... *H04N 19/174* (2014.11); *H04N 19/176* (2014.11); *H04N 19/46* (2014.11); *H04N 19/52* (2014.11); *H04N 19/573* (2014.11); *H04N 19/58* (2014.11); *H04N 19/70* (2014.11); *H04N 19/10* (2014.11); *H04N 19/82* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 5,884,004 | A | 3/1999 | Sato et al. |
| 6,052,414 | A | 4/2000 | Lee et al. |
| 6,055,264 | A | 4/2000 | Kenney et al. |
| 6,055,274 | A | 4/2000 | McVeigh |
| 6,381,276 | B1 | 4/2002 | Pesquet-Popescu |
| 6,430,224 | B1 | 8/2002 | Naito et al. |
| 6,441,844 | B1 | 8/2002 | Tatsuzawa |
| 6,625,320 | B1 | 9/2003 | Nilsson et al. |
| 6,693,964 | B1 | 2/2004 | Zhang et al. |
| 6,999,513 | B2 | 2/2006 | Sohn et al. |
| 7,728,877 | B2 | 6/2010 | Xin et al. |
| 7,796,808 | B2 | 9/2010 | Shioi et al. |
| 7,903,737 | B2 | 3/2011 | Martinian et al. |
| 7,965,769 | B2 | 6/2011 | Mallart et al. |
| 2003/0202592 | A1 | 10/2003 | Sohn et al. |
| 2003/0215014 | A1 | 11/2003 | Koto et al. |
| 2004/0008784 | A1 | 1/2004 | Kikuchi et al. |
| 2005/0001841 | A1 | 1/2005 | Francois et al. |
| 2005/0254010 | A1 | 11/2005 | Kato et al. |
| 2006/0133493 | A1 | 6/2006 | Cho et al. |
| 2007/0064799 | A1 | 3/2007 | Ha |
| 2007/0121722 | A1* | 5/2007 | Martinian ............ H04N 19/597 375/240.12 |
| 2007/0211802 | A1 | 9/2007 | Kikuchi et al. |
| 2007/0286281 | A1 | 12/2007 | Tsuchiya et al. |
| 2008/0219351 | A1 | 9/2008 | Kim et al. |
| 2010/0322311 | A1* | 12/2010 | Vetro .................... H04N 19/597 375/240.12 |
| 2013/0242048 | A1 | 9/2013 | Yin et al. |

FOREIGN PATENT DOCUMENTS

| | | |
|---|---|---|
| CN | 1545333 | 11/2004 |
| CN | 1568015 | 1/2005 |
| CN | 1577399 A | 2/2005 |
| CN | 101366285 | 2/2009 |
| CN | 102685489 | 9/2012 |
| EP | 1032219 | 8/2000 |
| EP | 1540961 | 3/2004 |
| GB | 2408889 | 6/2005 |
| JP | 2010191393 | 7/1998 |
| JP | 2010191394 | 7/1998 |
| JP | 2000132683 | 5/2000 |
| JP | 2003009179 | 1/2003 |
| JP | 2004007379 | 1/2004 |
| JP | 2004023458 | 1/2004 |
| JP | 2005110113 | 4/2005 |
| JP | 2005244503 | 9/2005 |
| JP | 2005328299 | 11/2005 |
| JP | 2008522694 | 7/2008 |
| JP | 2009502084 | 1/2009 |
| KR | 20030001758 | 1/2003 |
| KR | 20030083285 | 10/2003 |
| RU | 2107406 | 3/1998 |
| RU | 2189120 | 4/2000 |
| RU | 2258320 | 7/2004 |
| WO | WO9810593 | 3/1998 |
| WO | WO2004021711 | 3/2004 |
| WO | WO2004059980 | 7/2004 |
| WO | WO2004066639 | 8/2004 |
| WO | WO2005018217 | 2/2005 |
| WO | WO2005022923 | 3/2005 |
| WO | WO2007011147 | 1/2007 |
| WO | WO2007081756 | 7/2007 |
| WO | WO2007081926 | 7/2007 |

OTHER PUBLICATIONS

Sullivan et al.: "Video Compression-From Concepts to the H.264/AVC Standard," Proceedings of the IEEE, vol. 93, No. 1, Jan. 2005, pp. 18-31.

Li et al.: "A Novel Multi-View Video Coding Scheme Based on H.264," Information, Communications and Signal Processing, 2003, and 4th Pacific RIM Conf. on Multimedia (ICICS-PCM 2003), Singapore, Dec. 15-18, 2003, vol. 1, pp. 493-497.

Yip et al., "Joint Source and Channel Coding for H.264 Compliant Stereoscopic Video Transmission", Canadian Conference on Electrical and Computer Egineering, 2005 in Saskatoon, SK, May 1-4, 2005, IEEE, pp. 188-191.

Adikari et al., "A H.264 Compliant Stereoscopic Video Codec," Canadian Conference on Electrical and Computer Engineering in Saskatoon, SK, May 1-4, 2005, IEEE, pp. 1614-1617.

Chen et al., "Response to Call for Evidence on Multi-View Video Encoding," ISO/IEC JTC1/SC29/WG11, Coding of Moving Pictures and Audio, Hong Kong, China, Jan. 2005, Doc: MPEG2005/M11731, pp. 1-4.

ISO/IEC JTC1/SC29/WG11, "Updated Call for Proposals on Multi-view Video Coding," Doc. N7567, Nice, France, Oct. 2005.

ISO/IEC 13818-2, Amendment 3: "MPEG-2 Multiview Profile," ISO/IEC JTC1/SC29/WG11, Doc. No. N1366, Sep. 1996, 32 pages.

ISO/IEC JTC1/SC29/WG11, "Survey of Algorithms used for Multi-view Video Coding (MVC)," Doc. MPEG2005/N6909, 71st MPEG Meeting, Jan. 17-21, 2005, Hong Kong, China, Jan. 2005, 10 pages.

"Text of Committee Draft of Joint Video Specification (ITU-T Rec. H-264 ISO/IEC 14496-10 AVC), MPEG02/N4810," ISO/IEC JTC1/SC29/WG11 Doc.: MPEG02/N4810, Fairfax, US, May 2002, pp. 104-105.

Kimata et al.: "System Design of Free Viewpoint Video Communication", Computer and Information Technology, 2004, Cit '04, The 4th International Conference in Wuhan, China, Sep. 14-16, 2004, pp. 52-59.

Nevdyaev, Telecommunication Technologies, English-Russian explanatory dictionary-guide, Moscow, 2002, p. 490.

Wiegand, "Joint Committee Draft (CD)", ITU-T Recommendation H.264 (2002E), Joint Video Team (JVT) of ISO/IEC MPEG and ITU-T VCEG, Document: JVT-C167, 3rd Meeting: Fairfax, Virginia, May 6-10, 2002, pp. i-ix, 1-132.

Kim et al., "Dependent Bit Allocation in Multiview Video Coding," IEEE International Conference on Image Processing 2005 (ICIP'05), Geneva, Italy, Sep. 11-14, 2005, pp. 293-296, fig. 1.

(56) References Cited

OTHER PUBLICATIONS

International Telecommunication Union, "Advanced Video Coding for Generic Audiovisual Services," H.264, ITU-T Standard, Geneva, CH, May 30, 2003, pp. 1-282.
Kim et al. "Remarks About Implementing Multi-view Video Codec," 72nd MPEG Meeting, Apr. 18-22, 2005, Busan, Motion Picture Expert Group or ISO/IEC JTC1/SC29/WG11, No. M11981, Apr. 29, 2005, pp. 1-5.
Oh et al. "A Stereo Video Coding Scheme Based on H.264," Proceedings of SPIE, vol. 5909, Aug. 2, 2005, pp. 1-10.
Kim et al. "Efficient Disparity Vector Coding for Multiview Sequences," Signal Processing: Image Communication, Elsevier Science Publishers, Amsterdam, NL, vol. 19, No. 6, Jul. 1, 2004, pp. 539-553.
Lim et al. "A multiview sequence CODEC with view scalability," Signal Processing: Image Communication, Elsevier Science Publishers, Amsterdam, NL, vol. 19, No. 3, Mar. 1, 2004, pp. 239-256.
Wiegand et al., "Statistical Evaluation of Spatio-Temporal Prediction for Multi-View Video Coding," 2nd Workshop on Immersive Communication and Broadcast Systems (COB'05), Berlin, Germany, Oct. 2005, 4 pages.
International Organization for Standardization, ISO 2382-1:1993 Standard, http://www.pcmore.ru/informatisation/iso2381-1.html.
Amonou et al., "On the High Level Syntax for SVC", Joint Video Team (JVT) of ISO/IEC MPEG & ITU-VCEG, Document: JVT-P032, Jul. 31, 2005.

\* cited by examiner

METHODS AND APPARATUS FOR MULTI-VIEW VIDEO CODING

CROSS-REFERENCE TO RELATED APPLICATIONS

This application is a continuation application of co-pending U.S. patent application Ser. No. 13/872,502, filed Apr. 29, 2013, which is a continuation application of U.S. Non-Provisional patent application Ser. No. 12/087,357, filed Jul. 2, 2008, which further claims the benefit under 35 U.S.C. §365 of International Application PCT/US2007/000199 filed Jan. 8, 2007, which was published in accordance with PCT Article 21(2) on Jul. 19, 2007 in English, and which claims the benefit of U.S. Provisional Patent Application No. 60/757,289 filed on Jan. 9, 2006, herein incorporated by reference.

FIELD OF THE INVENTION

The present invention relates generally to video encoders and decoders and, more particularly, to methods and apparatus for Multi-view Video Coding.

BACKGROUND OF THE INVENTION

Multi-view video coding (MVC) is the compression framework for the encoding of multi-view sequences. A Multi-view Video Coding (MVC) sequence is a set of two or more video sequences that capture the same scene from a different view point.

It has been widely recognized that Multi-view Video Coding is a key technology that serves a wide variety of applications, including free-viewpoint and 3D video applications, home entertainment and surveillance. In those multi-view applications, the amount of video data involved is enormous. Thus, there exists the need for efficient compression technologies to improve the coding efficiency of current video coding solutions performing simulcast of independent views.

In recent years, much effort has been put in the design of efficient methods for compressing stereoscopic video. Conventional monoscopic compression methods can be applied independently to the left and right views of a stereo image pair. However, higher compression ratios can be achieved if the high correlation between views is exploited.

Regarding a prior art approach in which both views of a stereoscopic image pair are encoded, a Multi-View Profile (MVP) was defined in the International Organization for Standardization/International Electrotechnical Commission (ISO/IEC) Moving Picture Experts Group-2 (MPEG-2) standard to transmit a pair of video signals. MVP relies on a multi-layer signal representation approach such that one view (often the left view) is assigned to a base layer, and the other view is assigned to an enhancement layer. Monoscopic coding with the same tools as Main Profile (MP) is applied to the base layer. The enhancement layer is coded using temporal scalability tools and a hybrid prediction of motion and disparity fields.

In prior art methods relating to the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), stereoscopic video coding can be performed in two different ways: (i) as a particular case of interlaced image coding, where all the fields of a particular parity are assigned to the left view and all the fields of the opposite parity are considered the right view of the stereo-view content; or alternatively (ii) by alternating frames from the left and rights views to create a single monoscopic video sequence. A stereovision supplemental enhancement information (SEI) message provides an indication to the decoder of whether or not the coded video sequence represents stereoscopic content and which method was used to encode the corresponding content.

These previously known methods require minimum modifications of existing monoscopic coding techniques. However, they show a limited ability for reducing the redundancy existing between the two views in a stereoscopic pair. As a result, the encoding of stereo-view results in a large overhead when compared to the encoding of a single monoscopic view. Furthermore, there is no previous support for encoding of more than two camera views.

SUMMARY OF THE INVENTION

These and other drawbacks and disadvantages of the prior art are addressed by the present invention, which is directed to methods and apparatus for Multi-view Video Coding.

According to an aspect of the present invention, there is provided a video encoder. The video encoder includes an encoder for encoding a block in a picture by choosing between temporal prediction and cross-view prediction to enable a prediction for the block. The picture is one of a set of pictures corresponding to multi-view video content and having different view points with respect to a same or similar scene. The picture represents one of the different view points. A high-level syntax is used to indicate the use of cross-view prediction for the block.

According to another aspect of the present invention, there is provided a video encoder. The video encoder includes an encoder for encoding a block in a picture using a disparity vector. The picture corresponds to multi-view video content and is encoded to provide a resultant bit stream compliant with at least one of the International Organization for Standardization/International Electrotechnical Commission Moving Picture Experts Group-4 Part 10 Advanced Video Coding standard/International Telecommunication Union, Telecommunication Sector H.264 recommendation and an extension thereto.

According to yet another aspect of the present invention, there is provided a video encoder. The video encoder includes an encoder for encoding a block in a picture corresponding to multi-view video content based upon a disparity vector predictor that uses at least one of a temporally co-located disparity vector and a neighboring disparity vector of a temporally co-located block.

According to still another aspect of the present invention, there is provided a video encoding method. The method includes encoding a block in a picture by choosing between temporal prediction and cross-view prediction to enable a prediction for the block. The picture is one of a set of pictures corresponding to multi-view video content and having different view points with respect to a same or similar scene. The picture represents one of the different view points. A high-level syntax is used to indicate the use of cross-view prediction for the block.

According to a further aspect of the present invention, there is provided a video encoding method. The method includes encoding a block in a picture using a disparity vector, wherein the picture corresponds to multi-view video content and is encoded to provide a resultant bit stream compliant with at least one of the International Organization for Standardization/International Electrotechnical Commission Moving Picture Experts Group-4 Part 10 Advanced Video Coding standard/International Telecommunication Union, Telecommunication Sector H.264 recommendation and an extension thereto.

According to a still further aspect of the present invention, there is provided a video encoding method. The method includes encoding a block in a picture corresponding to multi-view video content based upon a disparity vector predictor that uses at least one of a temporally co-located disparity vector and a neighboring disparity vector of a temporally co-located block.

According to an additional aspect of the present invention, there is provided a video decoder. The video decoder includes a decoder for decoding a block in a picture by choosing between temporal prediction and cross-view prediction to enable a prediction for the block. The picture is one of a set of pictures corresponding to multi-view video content and having different view points with respect to a same or similar scene. The picture represents one of the different view points. A high-level syntax is read to determine the use of cross-view prediction for the block.

According to a yet additional aspect of the present invention, there is provided a video decoder. The video decoder includes a decoder for decoding a block in a picture using a disparity vector. The picture corresponds to multi-view video content and is decoded from a bit stream compliant with at least one of the International Organization for Standardization/International Electrotechnical Commission Moving Picture Experts Group-4 Part 10 Advanced Video Coding standard/International Telecommunication Union, Telecommunication Sector H.264 recommendation and an extension thereto.

According to another aspect of the present invention, there is provided a video decoder. The video decoder includes a decoder for decoding a block in a picture corresponding to multi-view video content based upon a disparity vector predictor that uses at least one of a temporally co-located disparity vector and a neighboring disparity vector of a temporally co-located block.

According to still another aspect of the present invention, there is provided a video decoding method. The method includes decoding a block in a picture by choosing between temporal prediction and cross-view prediction to enable a prediction for the block. The picture is one of a set of pictures corresponding to multi-view video content and having different view points with respect to a same or similar scene. The picture represents one of the different view points. A high-level syntax is read to determine the use of cross-view prediction for the block.

According to yet still another aspect of the present invention, there is provided a video decoding method. The method includes decoding a block in a picture using a disparity vector. The picture corresponds to multi-view video content and is decoded from a bit stream compliant with at least one of the International Organization for Standardization/International Electrotechnical Commission Moving Picture Experts Group-4 Part 10 Advanced Video Coding standard/ International Telecommunication Union, Telecommunication Sector H.264 recommendation and an extension thereto (400).

According to a further aspect of the present invention, there is provided a video decoding method. The method includes decoding a block in a picture corresponding to multi-view video content based upon a disparity vector predictor that uses at least one of a temporally co-located disparity vector and a neighboring disparity vector of a temporally co-located block.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed to methods and apparatus for Multi-view Video Coding.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Figure 1:
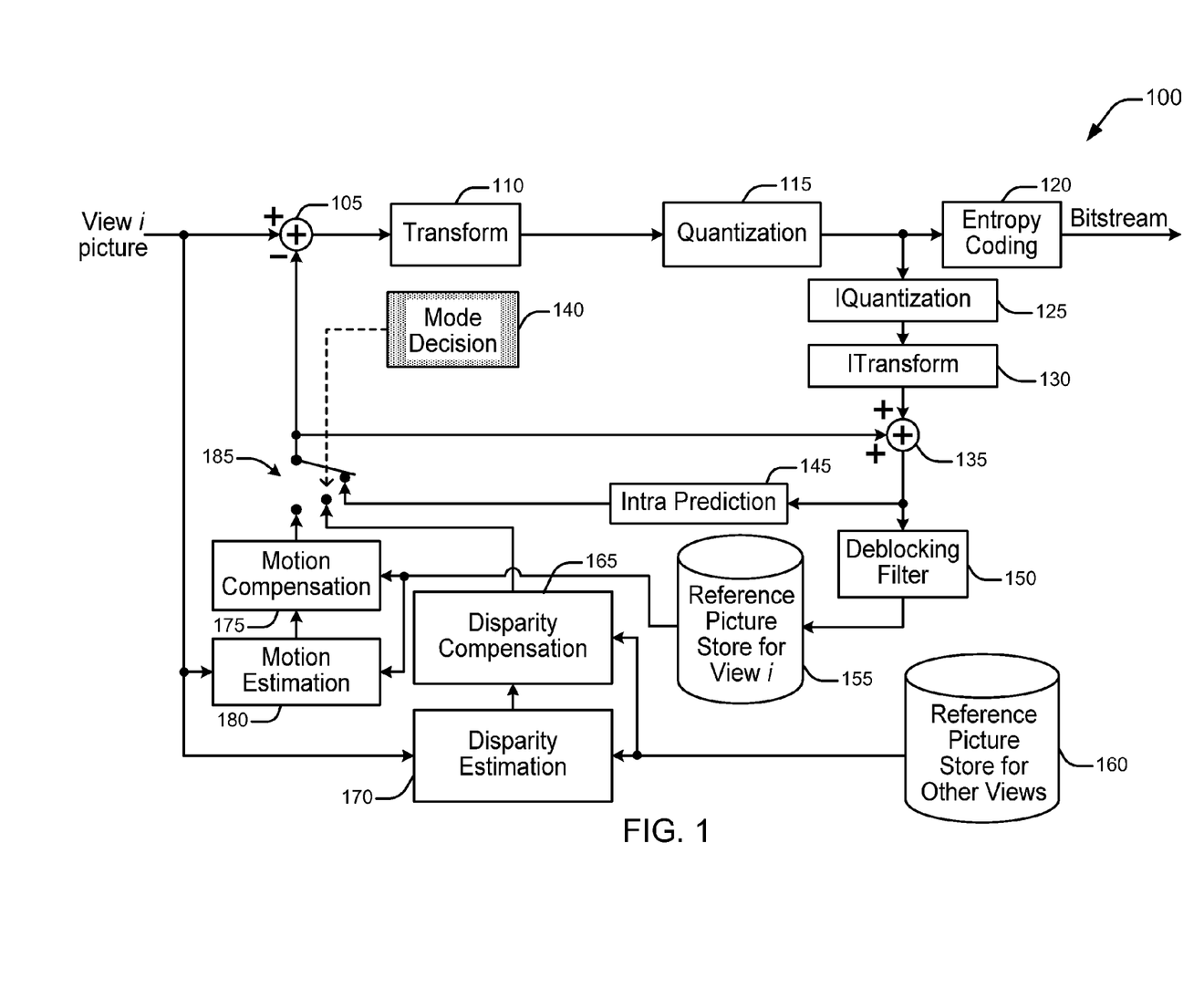
FIG. 1 is a block diagram for an exemplary Multi-view Video Coding (MVC) encoder to which the present principles may be applied, in accordance with an embodiment of the present principles.

Turning to FIG. 1, an exemplary Multi-view Video Coding (MVC) encoder is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. An output of the deblocking filter 150 is connected in signal communication with an input of a reference picture store 155 (for view i). An output of the reference picture store 155 is connected in signal communication with a first input of a motion compensator 175 and a first input of a motion estimator 180. An output of the motion estimator 180 is connected in signal communication with a second input of the motion compensator 175

An output of a reference picture store 160 (for other views) is connected in signal communication with a first input of a disparity/illumination estimator 170 and a first input of a disparity/illumination compensator 165. An output of the disparity/illumination estimator 170 is connected in signal communication with a second input of the disparity/illumination compensator 165.

An output of the entropy decoder 120 is available as an output of the encoder 100. A non-inverting input of the combiner 105 is available as an input of the encoder 100, and is connected in signal communication with a second input of the disparity/illumination estimator 170, and a second input of the motion estimator 180. An output of a switch 185 is connected in signal communication with a second non-inverting input of the combiner 135 and with an inverting input of the combiner 105. The switch 185 includes a first input connected in signal communication with an output of the motion compensator 175, a second input connected in signal communication with an output of the disparity/illumination compensator 165, and a third input connected in signal communication with an output of the intra predictor 145.

A mode decision module 140 has an output connected to the switch 185 for controlling which input is selected by the switch 185.

Figure 2:
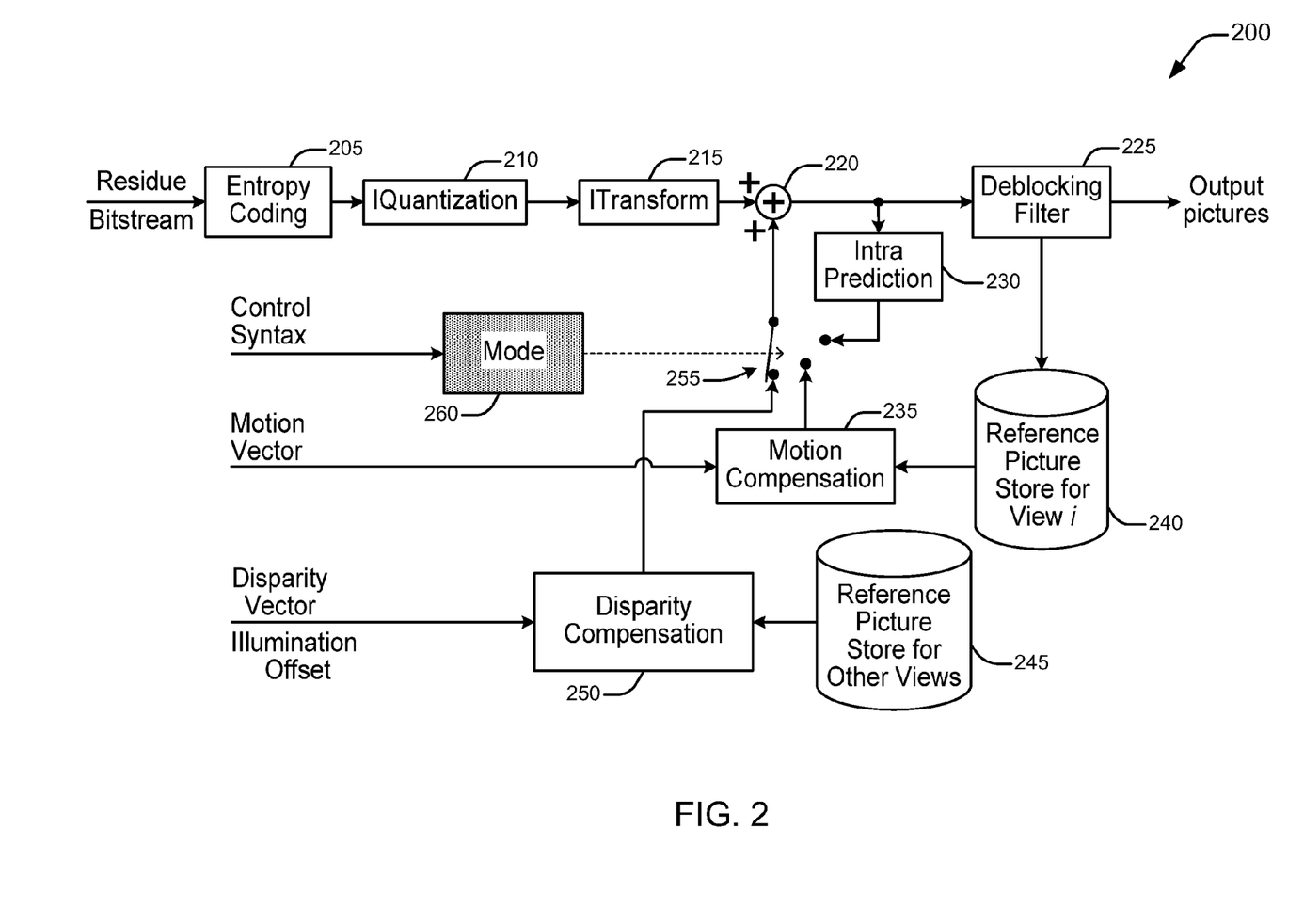
FIG. 2 is a block diagram for an exemplary Multi-view Video Coding (MVC) decoder to which the present principles may be applied, in accordance with an embodiment of the present principles.

Turning to FIG. 2, an exemplary Multi-view Video Coding (MVC) decoder is indicated generally by the reference numeral 200. The decoder 200 includes an entropy decoder 205 having an output connected in signal communication with an input of an inverse quantizer 210. An output of the inverse quantizer is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225 and an input of an intra predictor 230. An output of the deblocking filter 225 is connected in signal communication with an input of a reference picture store 240 (for view i). An output of the reference picture store 240 is connected in signal communication with a first input of a motion compensator 235.

An output of a reference picture store 245 (for other views) is connected in signal communication with a first input of a disparity/illumination compensator 250.

An input of the entropy coder 205 is available as an input to the decoder 200, for receiving a residue bitstream. Moreover, an input of a mode module 260 is also available as an input to the decoder 200, for receiving control syntax to control which input is selected by the switch 255. Further, a second input of the motion compensator 235 is available as an input of the decoder 200, for receiving motion vectors. Also, a second input of the disparity/illumination compensator 250 is available as an input to the decoder 200, for receiving disparity vectors and illumination compensation syntax.

An output of a switch 255 is connected in signal communication with a second non-inverting input of the combiner 220. A first input of the switch 255 is connected in signal communication with an output of the disparity/illumination compensator 250. A second input of the switch 255 is connected in signal communication with an output of the motion compensator 235. A third input of the switch 255 is connected in signal communication with an output of the intra predictor 230. An output of the mode module 260 is connected in signal communication with the switch 255 for controlling which input is selected by the switch 255. An output of the deblocking filter 225 is available as an output of the decoder.

Multi-view video coding (MVC) is the compression framework for the encoding of multi-view sequences. A Multi-view Video Coding (MVC) sequence is a set of two or more video sequences that capture the same scene from a different view point.

Since a multi-view video source includes multiple views of the same scene, there exists a high degree of correlation between the multiple view images. Therefore, view redundancy can be exploited in addition to temporal redundancy and is achieved by performing view prediction across the different views. Accordingly, embodiments of the present principles described herein may involve both temporal and cross-view prediction.

For illustrative purposes, embodiments of the present principles are described herein with respect to the MPEG-4 AVC standard. However, it is be appreciated that the present invention is not limited to the MPEG-4 AVC standard and, given the teachings of the present principles provided herein, one of ordinary skill in this and related arts will contemplate this and other video coding standards capable of Multi-view Video Coding to which the present principles may be applied, while maintaining the scope of the present principles. Embodiments of the present principles described herein relating to the MPEG-4 AVC standard may involve, e.g., deblocking filter changes and/or entropy coding of syntaxes.

In an embodiment, at the slice level, cross-view prediction lists are introduced to enable disparity prediction, and a cross-view coding type syntax is added to indicate the coding type of disparity prediction. At the macroblock (MB) level, a flag syntax is introduced to indicate whether motion compensation or disparity compensation is used for each signal block. Moreover, other changes that may utilized in embodiments directed to the MPEG-4 AVC standard include, e.g., a deblocking filter, Context Adaptive Binary Arithmetic Coding (CABAC) contexts for the new syntaxes, and additional syntaxes in the parameter set level and slice header level.

A description will now be given regarding cross-view coding type and cross-view reference lists in accordance with an embodiment of the present principles.

The MPEG-4 AVC standard performs inter-frame prediction by forming two prediction lists, List0 and List1. Hence, an image block in the current frame can be compensated either by using only one reference picture in the List0, or by using two references pictures, one from each list. In the slice header, a slice_type syntax is signaled to indicate the temporal coding type for each slice. When slice_type=P_SLICE, only List0 will be used in motion compensation. When slice_type=B_SLICE, both List0 and List1 can possibly be used in motion compensation.

To enable cross-view prediction among different views, an embodiment of the present principles involves using two new prediction lists: ViewList0 and ViewList1. Pictures in ViewList0/ViewList1 are reference pictures from camera views other than the current view. A new syntax view_slice_type in the slice header is used to indicate the coding type for the cross-view prediction. For example, if a specific slice has slice_type=B_SLICE and view_slice_type=P_SLICE, then a macroblock (MB) in that slice can be either temporally coded as a B_SLICE coding type, or cross-view coded as a P_SLICE coding type.

An alternative way of enabling cross-view predictions in the MPEG-4 AVC standard frame work involves inserting reference pictures from other view in the lists List0/List1 without introducing new view prediction lists and cross-view coding type. However, the advantages of the first approach are as follows. One advantage of the first approach is that since reference pictures in ViewList0/ViewList1 only include cross-view references, signaling the ref_idx will spend less bits than having both same-view references and cross-view references in the same list. Another advantage of the first approach is that having two new lists ViewList0/ViewList1 provides a separate way of handing temporal and cross-view predictions. This relates to the case where the List0/List1 include both temporal references and cross-view references, so that the MPEG-4 AVC standard reordering process for reference picture lists construction will need to be modified and will necessarily be more complex.

In an embodiment, cross-view reference lists for each slice may be formed according to the following rules. With respect to a first rule, in the slice header, the number of cross-view reference pictures and their view_id's are signaled for both ViewList0 and ViewList1. The view_id's are distinctive in each of the two cross-view prediction lists. With respect to a second rule, reference pictures in the cross-view prediction list are ordered in the same sequence as they appear in the slice header. For each referred view, the reference picture with the closest Picture Order Count (POC) number (with respect to the POC of current slice) is used in current slice's cross-view prediction list.

Additional reference reordering syntaxes can be included to allow more flexible handling of cross-view reference pictures.

Figure 3:
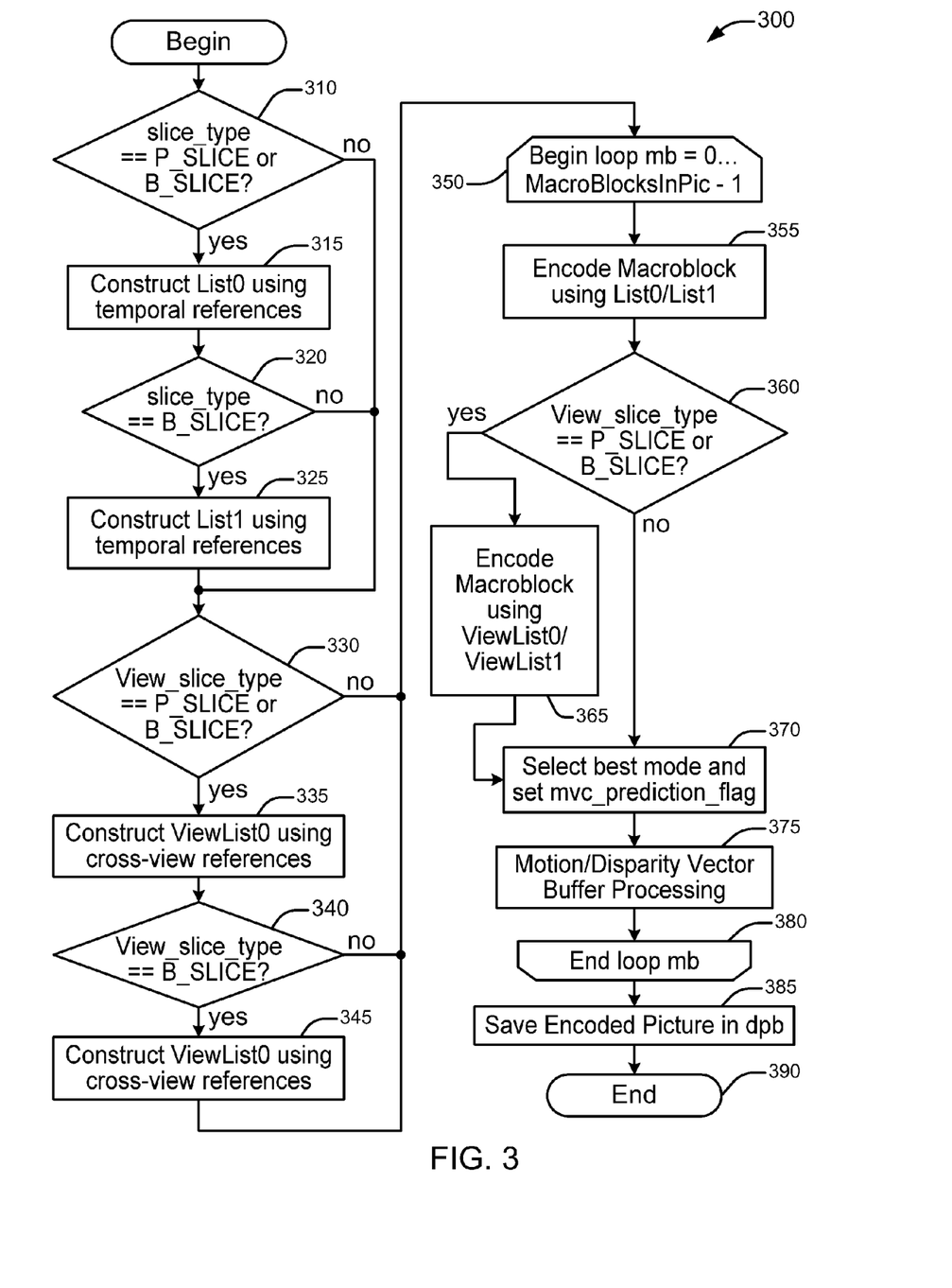
FIG. 3 is a flow diagram for an exemplary method for reference list construction for multi-view video content in accordance with an embodiment of the present principles.

Turning to FIG. 3, an exemplary method for reference list construction for multi-view video content is indicated generally by the reference numeral 300. The method 300 includes a start block 305 that passes control to a decision block 310. The decision block 310 determines whether or not a current slice type is P slice or B slice. If so, then control is passed to a function block 315. Otherwise, control is passed to a decision block 330.

The function block 315 constructs List0 using temporal references, and passes control to a decision block 320. The decision block 320 determines whether or not the current slice type is B slice. If so, then control is passed to function block 325. Otherwise, control is passed to the decision block 330.

The function block 325 constructs List1 using temporal references, and passes control to the decision block 330.

The decision block 330 determines whether or not the current view slice type is P slice or B slice. If so, then control is passed to a function block 335. Otherwise, control is passed to a loop limit block 350.

The function block 335 constructs ViewList0 using cross-view references, and passes control to a decision block 340. The decision block 340 determines whether or not the current view slice type is B slice. If so, then control is passed to a function block 345. Otherwise, control is passed to the loop limit block 350.

The function block 345 constructs ViewList0 using cross-view references, and passes control to the loop limit block 350.

The loop limit block 350 begins a loop over each macroblock including setting a range for the loop using a variable mb=0 to MacroBlocksInPic-1, and passes control to a function block 355. The function block 355 encodes a current macroblock using List0/List1, and passes control to a decision block 360. The decision block 360 determines whether or not the current view slice type is equal P slice or B slice. If so, the control is passed to a function block 365. Otherwise, control is passed to a function block 370.

The function block 365 encodes the current macroblock using ViewList0/ViewList1, and passes control to the function block 370.

The function block 370 selects the best mode, sets the mvc_prediction_flag, and passes control to a function block 375. The function block 375 performs motion/disparity vector buffer processing, and passes control to a loop limit block 380. The loop limit block ends the loop, and passes control to a function block 385. The function block 385 saves the encoded picture in decoded pictures buffer (dqb), and passes control to an end block 390.

Since the cross-view prediction of each slice is fully configurable using cross-view coding type and view prediction lists, the Multi-view Video Coding (MVC) codec can support arbitrary view coding order and view scalability.

In an embodiment, at the MB level, a new syntax called mvc_pred_flag indicates whether temporal prediction or cross-view prediction is used for coding each signal block. In the case of mvc_pred_flag=0, List0/List1 will be utilized for motion compensation depending on slice_type. When mvc_pred_flag=1, then ViewList0/ViewList1 will be utilized depending on view slice type.

Figure 4:
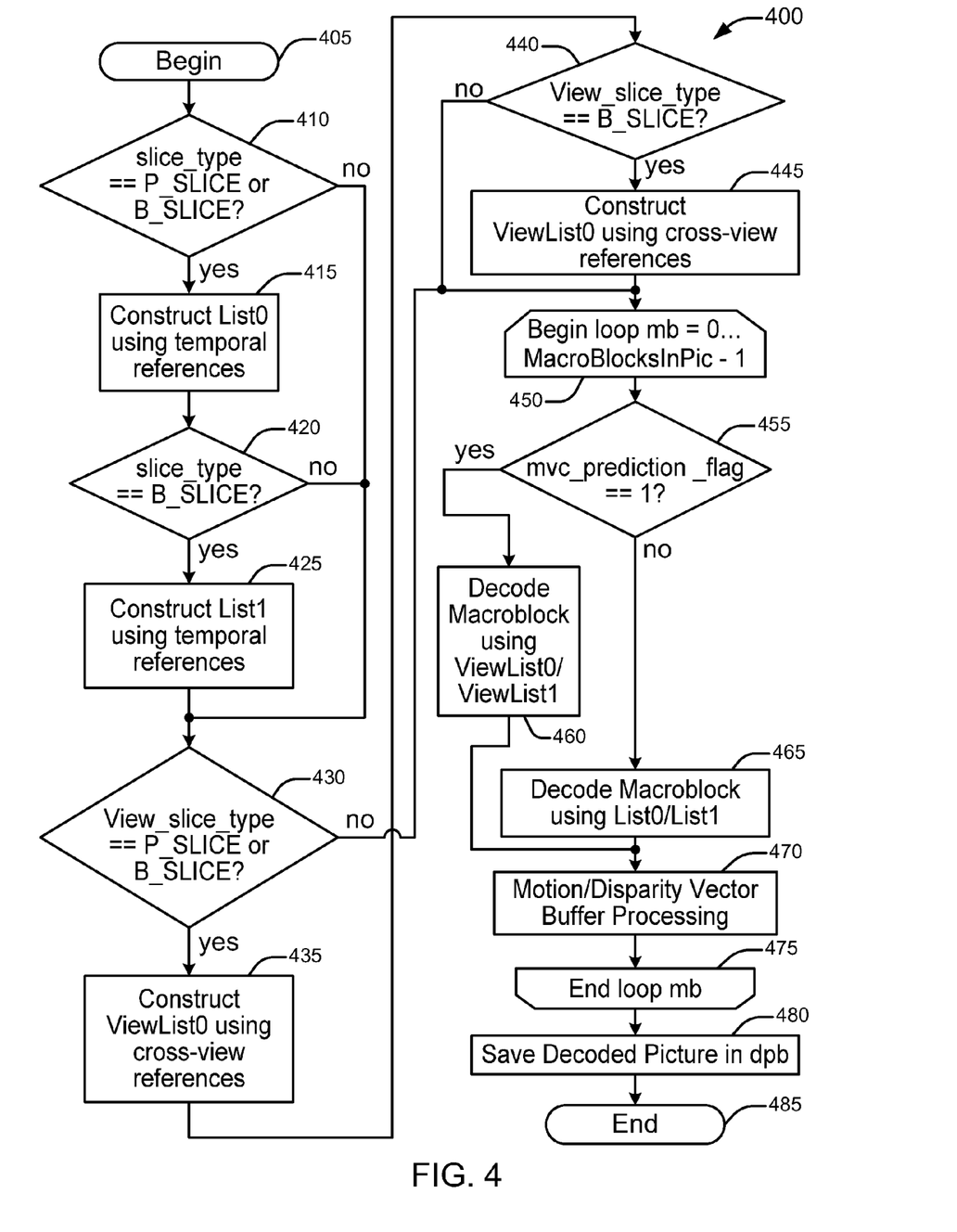
FIG. 4 is a flow diagram for an exemplary method for performing a temporal/cross view mode decision in accordance with an embodiment of the present principles.

Turning to FIG. 4, an exemplary method for performing a temporal/cross view mode decision is indicated generally by the reference numeral 400. The method 400 includes a start block 405 that passes control to a decision block 410. The decision block 410 determines whether or not the current slice type is P slice or B slice. If so, then control is passed to a function block 415. Otherwise, control is passed to a decision block 430.

The function block 415 constructs List0 using temporal references, and passes control to a decision block 420. The decision block 420 determines whether or not the current slice type is B slice. If so, the control is passed to a function block 425. Otherwise, control is passed to the decision block 430.

The function block 425 constructs List1 using temporal references, and passes control to the decision block 430.

The decision block 430 determines whether or not the current view slice type is P slice or B slice. If so, then control is passed to a function block 435. Otherwise, control is passed to a loop limit block 450.

The function block 435 constructs ViewList0 using cross-view references, and passes control to a decision block 440. The decision block 440 determines whether or not the current view slice type is B slice. If so, then control is passed to a function block 445. Otherwise, control is passed to the loop limit block 450.

The function block 445 constructs the ViewList0 using cross-view references, and passes control to the loop limit block 450.

The loop limit block 450 begins a loop over each macroblock including setting a range for the loop using a variable mb=0 to MacroBlocksInPic-1, and passes control to a decision block 455. The decision block 455 determines whether or not mvc_prediction_flag is equal to 1. If so, then control is passed to a function block 460. Otherwise, control is passed to a function block 465.

The function block 460 decodes a macroblock using ViewList0/ViewList1, and passes control to a function block 470.

The function block 465 decodes the macroblock using List0/List1, and passes control to a function block 470.

The function block 470 performs motion/disparity vector buffer processing, and passes control to a loop limit block 475. The loop limit block 475 ends the loop, and passes control to a function block 480. The function block 480 saves the decoded picture in decoded pictures buffer (dqb), and passes control to an end block 485.

Three new CABAC contexts are added for coding the mvc_pred_dir syntax. The context modeling is the same as the transform_size_8×8_flag syntax.

In the multi-view extension of the MPEG-4 AVC standard, the decoded picture buffer (dpb) needs to be able to handle decoded pictures from multiple views. Assuming there are N input views, an embodiment of the present principles may involve N separate dpb's. Each dpb stores the decoded pictures from one specific view.

An alternative way of managing dpb is to put all view pictures in a single dpb. However, the first approach has the following advantages. One advantage of the first approach is that each view has its own dpb, with the same decoded reference marking process as in the MPEG-4 AVC standard. This simpler approach reduces the complications of managing different view pictures in the same dpb. Another advantage of the first approach relates to the undesirability of reducing the number of available temporal reference frames, since temporal correlation is generally stronger than cross-view correlation. With each view managing its own reference pictures in its dpb, the temporal prediction will have the same multiple reference frame prediction capability as in simulcast.

A distinctive trait of MVC comparing to conventional video coding is the co-existence of both motion and disparity. The blocks that are temporally predicted will need to signal motion vectors (MV), versus disparity vectors (DV) for cross-view prediction.

Two exemplary methods are described herein for dealing with both motion vectors and disparity vectors for the same slice. However, it is to be appreciated that given the teachings of the present invention provided herein, one of ordinary skill in this and related arts will contemplate these and other methods for the same, while maintaining the scope of the present invention.

In the first method, for each block, signal and store either a motions vector or a disparity vector but not both. Whether a motion vector or a disparity vector will be signaled and stored depends on the syntax mvc_pred_flag. This will require less memory storage, but the combined vector field will not be consistent.

In the second method, for each block, store both a motion vector and a disparity vector. This can be achieved by either signaling both vectors, or only signal one and fill the other one using vector field interpolation. This approach will take more memory storage, but the consistency of both motion and disparity fields can be better preserved.

Figure 5:
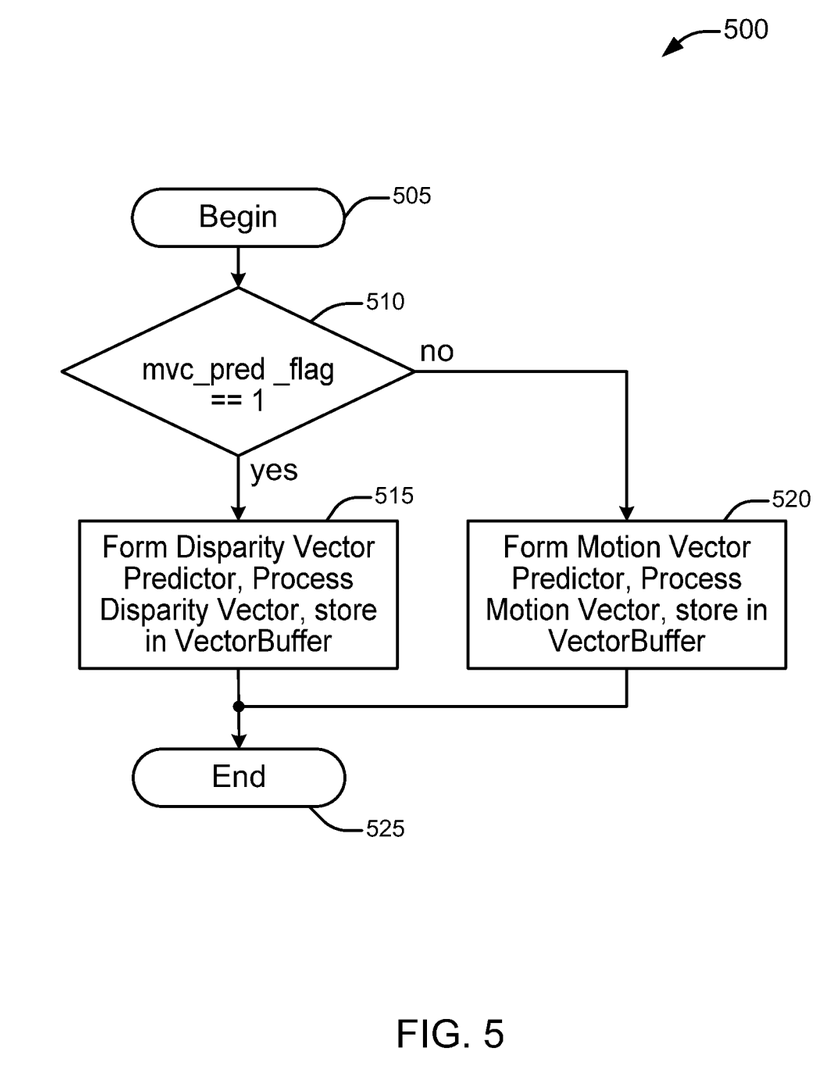
FIG. 5 is a flow diagram for an exemplary method for processing motion and disparity vectors for the same slice corresponding to multi-view video content in accordance with an embodiment of the present principles.

An exemplary embodiment of the first method is shown and described with respect to FIG. 5. An exemplary embodiment of the second method is shown and described with respect to FIG. 6.

Turning to FIG. 5, an exemplary method for processing motion and disparity vectors for the same slice corresponding to multi-view video content is indicated generally by the reference numeral 500. The method 500 includes a start block 505 that passes control to a decision block 510. The decision block 510 determines whether or not the mvc_pred_flag is equal to 0. If so, then control is passed to a function block 515. Otherwise, control is passed to a function block 520. The function block 515 forms the disparity vector predictor, processes the disparity vector DV, stores the disparity vector DV in VectorBuffer, and passes control to an end block 525.

The function block 520 forms the motion vector predictor, processes the motion vector MV, stores the motion vector MV in VectorBuffer, and passes control to the end block 525.

Figure 6:
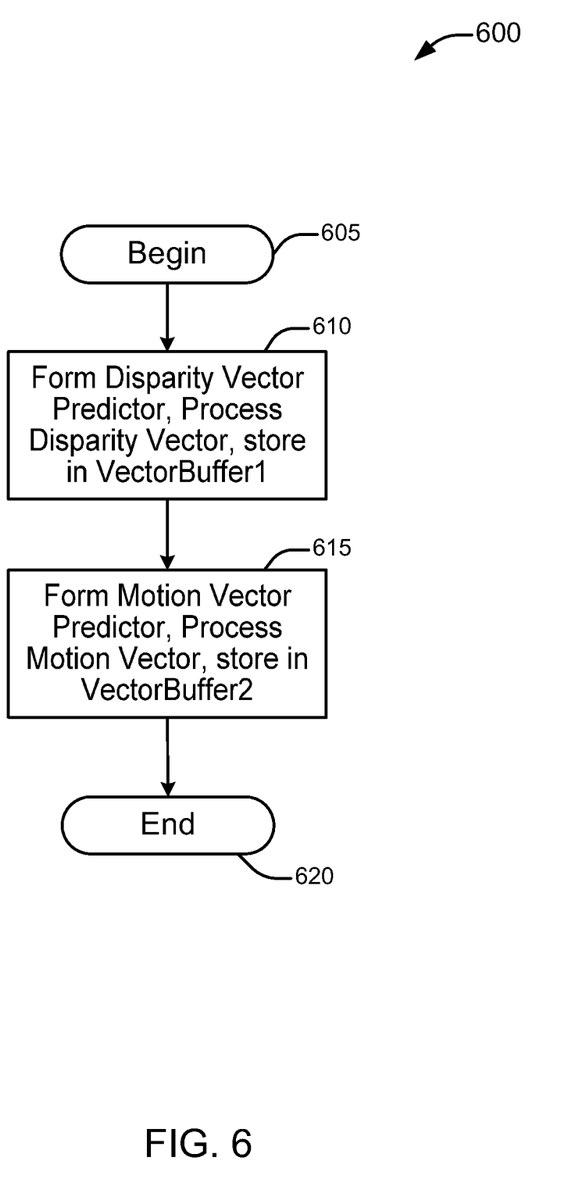
FIG. 6 is a flow diagram for another method for processing motion and disparity vectors for multi-view video content in accordance with an embodiment of the present principles.

Turning to FIG. 6, another method for processing motion and disparity vectors for multi-view video content is indicated generally by the reference numeral 600. The method 600 includes a start block 605 that passes control to a function block 610. The function block 610 forms the disparity vector predictor, processes the disparity vector DV, stores the disparity vector DV in VectorBuffer1, and passes control to a function block 615. The function block 615 forms the motion vector predictor, processes the motion vector MV, stores the motion vector MV in VectorBuffer2, and passes control to an end block 620.

The implication of having both motion and disparity vectors in the coding of the same slice arises in the following aspects: (1) predictive coding of motion/disparity vectors; and (2) Direct and Skip modes.

In the MPEG-4 AVC standard, motion vector components are differentially coded using either median or directional prediction from neighboring blocks. In Multi-view Video Coding, the neighboring blocks might have a different prediction direction(s) than the current block. In order to save bits in the coding of motion/disparity vectors, it is preferable to use the most correlated information to form a predictor. Depending upon whether there are both motion vectors and disparity vectors available for the neighboring blocks, for the first method, use only those neighboring blocks that have the same prediction direction; for the second method, use only the motion vectors of the neighboring blocks in forming the motion vector predictor, and use only the disparity vectors of the neighboring blocks in forming the disparity predictor.

Aside from spatial neighboring blocks, temporally co-located blocks can also be used to enhance the disparity prediction because the disparity fields are usually stationary in the temporal dimension.

Skip and Direct modes in the MPEG-4 AVC standard are effective coding tools that better exploit the spatiotemporal correlation that exists between adjacent macroblocks, because they can represent motion without having to transmit motion vectors. In Multi-view Video Coding, those modes should be adapted in order to take into account the additional cross-view correlation.

For P_Skip modes, the reconstructed signal is obtained similar to the prediction signal of a P_16×16 macroblock type that references the picture which is located at index 0 of List0. The motion vector used for reconstructing the P_Skip macroblock is similar to the motion vector predictor for the 16×16 block. In MVC, the above-mentioned adaptation of the motion/disparity vector predictor will help to make P_Skip mode more useful.

For B_SLICE coding, B_Skip/B_Direct_16×16/B_Direct_8×8 modes should be adapted to consider the mixing of motion and disparity. There are two different Direct modes supported in the MPEG-4 AVC standard, namely temporal Direct and spatial Direct.

For the temporal Direct mode, motion vectors are derived from the co-located position in the first List1 reference. When the first List1 reference is disparity predicted, the system can either look for motion vectors at the lo-located position in other List1 references (ref_idx>0), or use the spatial motion vector predictor.

For the spatial Direct mode, the motion vectors are derived in a similar manner employed by P_SKIP, but with both List0/List1 considered. The same adaptation done in P_SKIP can be extended in List1 also.

Tables 1-4 illustrates various syntaxes for Multi-view Video Coding including those in accordance with various embodiments of the present principles. Table 1 illustrates the sequence parameter set RBSP syntax for Multi-view Video Coding. Table 2 illustrates the picture parameter set RBSP syntax for Multi-view Video Coding. Table 3 illustrates the slice header syntax for Multi-view Video Coding. Table 4 illustrates the macroblock layer syntax for Multi-view Video Coding.

TABLE 1

| seq_parameter_set_rbsp( ) { | C | Descriptor |
|---|---|---|
| log2_max_view_num_minus1 | 0 | ue(v) |
| num_views_sps | 0 | u (log2_max_view_num_minus1+1) |
| view_id_sps | 0 | u (log2_max_view_num_minus1+1) |
| profile_ide | 0 | u(8) |
| constraint_set0_flag | 0 | u(1) |
| constraint_set1_flag | 0 | u(1) |
| constraint_set2_flag | 0 | u(1) |
| constraint_set3_flag | 0 | u(1) |
| reserved_zero_4bits /* equal to 0 */ ... | 0 | u(4) |

TABLE 2

| pic_parameter_set_rbsp( ) { | C | Descriptor |
|---|---|---|
| view_id_pps | 0 | u(log2_max_view_num_minus1+1) |
| pic_parameter_set_id | 1 | ue(v) |
| seq_parameter_set_id | 1 | ue(v) |
| entropy_coding_mode_flag | 1 | u(1) |
| pic_order_present_flag | 1 | u(1) |
| num_slice_groups_minus1 ... | 2 | ue(v) |

TABLE 3

| slice_header( ) { | C | Descriptor |
|---|---|---|
| first_mb_in_slice | 2 | ue(v) |
| view_id | 2 | u (log2_max_view_num_minus1+1) |
| view_slice_type | 2 | ue(v) |
| if (view_slice_type == VL_SLICE) { | | |
| num_ref_idx_Il_active_minus1 | 2 | ue(v) |
| for (i=0; i<= num_ref_idx_Il_active_minus1; i++) { | | |
| left_ref_view_id[i] | 2 | ue(v) |
| } | | |
| } | | |
| if (view_slice_type == VR_SLICE) { | | |

TABLE 3-continued

| slice_header( ) { | C | Descriptor |
|---|---|---|
|     num_ref_idx_lr_active_minus1 | 2 | ue(v) |
|     for (i=0; i<= num_ref_idx_lr_active_minus1; i++) { | | |
|         right_ref_view_id[i] | 2 | ue(v) |
|     } | | |
| } | | |
| if (view_slice_type == VB_SLICE) { | | |
|     num_ref_idx_ll_active_minus1 | 2 | ue(v) |
|     for (i=0; i<= num_ref_idx_ll_active_minus1; i++) { | | |
|         left_ref_view_id[i] | 2 | ue(v) |
|     } | | |
|     num_ref_idx_lr_active_minus1 | 2 | ue(v) |
|     for (i=0; i<= num_ref_idx_lr_active_minus1; i++) { | | |
|         right_ref_view_id[i] | 2 | ue(v) |
|     } | | |
| } | | |
| ... | | |
| slice_type | 2 | ue(v) |
| pic_parameter_set_id | 2 | ue(v) |
| frame_num | 2 | u(v) |
| ... | | |

TABLE 4

| macroblock_layer( ) { | C | Descriptor |
|---|---|---|
|     mve_pred_flag | 2 | u(1)\|ue(v) |
|     mb_type | 2 | ue(v)\|ue(v) |
|     if( mb_type = = I_PCM ) { | | |
|         while( !byte_aligned( ) ) | | |
|             pcm_alignment_zero_bit | 2 | f(1) |
|         for( i = 0; i < 256; i++ ) | | |
|             pcm_sample_luma[ i ] | 2 | u(v) |
| ... | | |

A description will now be given of some of the many attendant advantages/features of the present invention, some of which have been mentioned above. For example, one advantage/feature is a video encoder that includes an encoder for encoding a block in a picture by choosing between temporal prediction and cross-view prediction to enable a prediction for the block. The picture is one of a set of pictures corresponding to multi-view video content and having different view points with respect to a same or similar scene. The picture represents one of the different view points. A high-level syntax is used to indicate the use of cross-view prediction for the block.

Another advantage/feature is the video encoder as described above, wherein the encoder encodes the picture to provide a resultant bit stream compliant with at least one of the International Organization for Standardization/International Electrotechnical Commission Moving Picture Experts Group-4 Part 10 Advanced Video Coding standard/International Telecommunication Union, Telecommunication Sector H.264 recommendation and an extension thereto.

Yet another advantage/feature is the video encoder as described above, wherein the high-level syntax includes a slice-level syntax.

Moreover, another advantage/feature is the video encoder as described above, wherein a block-level syntax is used to indicate whether motion compensation or disparity compensation is applied to the block.

Further, another advantage/feature is a video encoder that includes an encoder for encoding a block in a picture using a disparity vector. The picture corresponds to multi-view video content and is encoded to provide a resultant bit stream compliant with at least one of the International Organization for Standardization/International Electrotechnical Commission Moving Picture Experts Group-4 Part 10 Advanced Video Coding standard/International Telecommunication Union, Telecommunication Sector H.264 recommendation and an extension thereto.

Also, another advantage/feature is the video encoder as described above, wherein the encoder mixes a motion vector and the disparity vector, both corresponding to the block, in a single vector field.

Additionally, another advantage/feature is the video encoder as described above, wherein the encoder encodes the block using at least one of a motion vector predictor and a disparity vector predictor derived from only neighboring blocks that have at least one of a same temporal prediction flag and a same cross-view prediction flag as the block.

Moreover, another advantage/feature is the video encoder as described above, wherein the encoder encodes the block using separate vector fields for a motion vector and a disparity vector corresponding to the block.

Also, another advantage/feature is the video encoder as described above, wherein the encoder encodes the block using at least one of a motion vector predictor that only refers to a corresponding motion vector field and a disparity vector predictor that only refers to a corresponding disparity vector field, the motion vector field and the disparity vector field included in the separate vector fields.

Additionally, another advantage/feature is a video encoder that includes an encoder for encoding a block in a picture corresponding to multi-view video content based upon a disparity vector predictor that uses at least one of a temporally co-located disparity vector and a neighboring disparity vector of a temporally co-located block.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A non-transitory processor readable medium having stored thereon an encoded bitstream, the encoded bitstream comprising:
   a first block in a picture, the first block being encoded using a disparity vector, the picture being one picture of a set of pictures corresponding to multi-view video content, the picture representing one of the different view points; and
   a second block in the picture, the second block being encoded using a motion vector,
   wherein a disparity vector predictor corresponding to the disparity vector is formed using only disparity vectors of blocks adjacent to the first block, and a motion vector predictor corresponding to the motion vector is formed using only motion vectors of blocks adjacent to the second block.

2. A method of video encoding, comprising:
   encoding a first block in a picture using a disparity vector, wherein the picture corresponds to multi-view video content; and
   encoding a second block in the picture using a motion vector,
   wherein a disparity vector predictor corresponding to the disparity vector is formed using only disparity vectors of blocks adjacent to the first block, and a motion vector predictor corresponding to the motion vector is formed using only motion vectors of blocks adjacent to the second block.

3. The method of claim 2, wherein a single vector field is formed, a motion vector for a block is used in the vector field when motion compensation is used for the block and a disparity vector is used when disparity compensation is used for the block.

4. The method of claim 2, wherein a motion vector field and a disparity vector field are formed separately, and wherein the motion vector predictor is derived from the motion vector field and the disparity vector predictor is derived from the disparity vector field.

5. An apparatus for video encoding, comprising at least a memory and one or more processors, the one or more processors configured to:
   encode a first block in a picture using a disparity vector, wherein the picture corresponds to multi-view video content; and
   encode a second block in the picture using a motion vector,
   wherein a disparity vector predictor corresponding to the disparity vector is formed using only disparity vectors of blocks adjacent to the first block, and a motion vector predictor corresponding to the motion vector is formed using only motion vectors of blocks adjacent to the second block.

6. The apparatus of claim 5, wherein a single vector field is formed, a motion vector for a block is used in the vector field when motion compensation is used for the block and a disparity vector is used when disparity compensation is used for the block.

7. The apparatus of claim 5, wherein a motion vector field and a disparity vector field are formed separately, and wherein the motion vector predictor is derived from the motion vector field and the disparity vector predictor is derived from the disparity vector field.

8. A method of video decoding, comprising:
   decoding a first block in a picture using a disparity vector, wherein the picture corresponds to multi-view video content; and
   decoding a second block in the picture using a motion vector,
   wherein a disparity vector predictor corresponding to the disparity vector is formed using only disparity vectors of blocks adjacent to the first block, and a motion vector predictor corresponding to the motion vector is formed using only motion vectors of blocks adjacent to the second block.

9. The method of claim 8, wherein a single vector field is formed, a motion vector for a block is used in the vector field when motion compensation is used for the block and a disparity vector is used when disparity compensation is used for the block.

10. The method of claim 8, wherein a motion vector field and a disparity vector field are formed separately, and wherein the motion vector predictor is derived from the motion vector field and the disparity vector predictor is derived from the disparity vector field.

11. An apparatus for video decoding, comprising at least a memory and one or more processors, the one or more processors configured to:
   decode a first block in a picture using a disparity vector, wherein the picture corresponds to multi-view video content; and
   decode a second block in the picture using a motion vector,
   wherein a disparity vector predictor corresponding to the disparity vector is formed using only disparity vectors of blocks adjacent to the first block, and a motion vector predictor corresponding to the motion vector is formed using only motion vectors of blocks adjacent to the second block.

12. The apparatus of claim 11, wherein a single vector field is formed, a motion vector for a block is used in the vector field when motion compensation is used for the block and a disparity vector is used when disparity compensation is used for the block.

13. The apparatus of claim 11, wherein a motion vector field and a disparity vector field are formed separately, and wherein the motion vector predictor is derived from the motion vector field and the disparity vector predictor is derived from the disparity vector field.

* * * * *